United States Patent
Moon et al.

(10) Patent No.: US 7,764,964 B2
(45) Date of Patent: Jul. 27, 2010

(54) MOBILE COMMUNICATION SYSTEM AND RADIO NETWORK CONTROLLER

(75) Inventors: Sung Uk Moon, Yokosuka (JP); Takehiro Nakamura, Yokosuka (JP); Minami Ishii, Yokohama (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1469 days.

(21) Appl. No.: 11/132,396

(22) Filed: May 19, 2005

(65) Prior Publication Data
US 2005/0260992 A1  Nov. 24, 2005

(30) Foreign Application Priority Data
May 20, 2004  (JP) .............................. 2004-150675

(51) Int. Cl.
*H04W 36/00* (2009.01)
*H04B 7/212* (2006.01)

(52) U.S. Cl. .................... 455/436; 455/450; 455/452.1; 455/442

(58) Field of Classification Search ................. 455/436, 455/433, 67.11, 450, 452.1, 453, 456.6, 442; 370/333, 337, 347, 321, 442, 331
See application file for complete search history.

(56) References Cited

U.S. PATENT DOCUMENTS

| 5,577,047 A | 11/1996 | Persson et al. |
| 6,591,113 B1 * | 7/2003 | Mortensen .................. 455/522 |
| 6,868,520 B1 * | 3/2005 | Fauconnier ................. 714/790 |

FOREIGN PATENT DOCUMENTS

| EP | 0 797 369 A2 | 9/1997 |
| JP | 2001-103529 | 4/2001 |
| WO | WO 2004/023695 A2 | 3/2004 |
| WO | WO 2005/048484 A1 | 5/2005 |

OTHER PUBLICATIONS

"3$^{rd}$ Generation Partnership Project; Technical Specification Group Radio Access Network; Broadcast/Multicast Control (BMC) (Release 6)", 3GPP TS 25.324 V6.0.0, 2003, pp. 1-24.

* cited by examiner

*Primary Examiner*—Melur Ramakrishnaiah
(74) *Attorney, Agent, or Firm*—Oblon, Spivak, McClelland, Maier & Neustadt, L.L.P.

(57) ABSTRACT

A mobile communication system for transmitting a plurality of same information to a plurality of cells. The mobile communication system includes a transmission timing determining unit for determining a transmission timing of the same information to each of the cells randomly or in such a manner that transmission timings differ between the cells, and a transmitting unit for transmitting the same information to the cells at the determined transmission timings.

10 Claims, 10 Drawing Sheets

MOBILE COMMUNICATION SYSTEM AND RADIO NETWORK CONTROLLER

CROSS REFERENCE TO RELATED APPLICATION

This application is based upon and claims the benefit of priority from the prior Japanese Patent Application No. P2004-150675, filed on May 20, 2004; the entire contents of which are incorporated herein by reference.

BACKGROUND OF THE INVENTION

1. Field of the Invention

The present invention relates to a mobile communication system and a radio network controller for transmitting a plurality of same information to a plurality of cells.

2. Description of the Related Art

Figure 1:
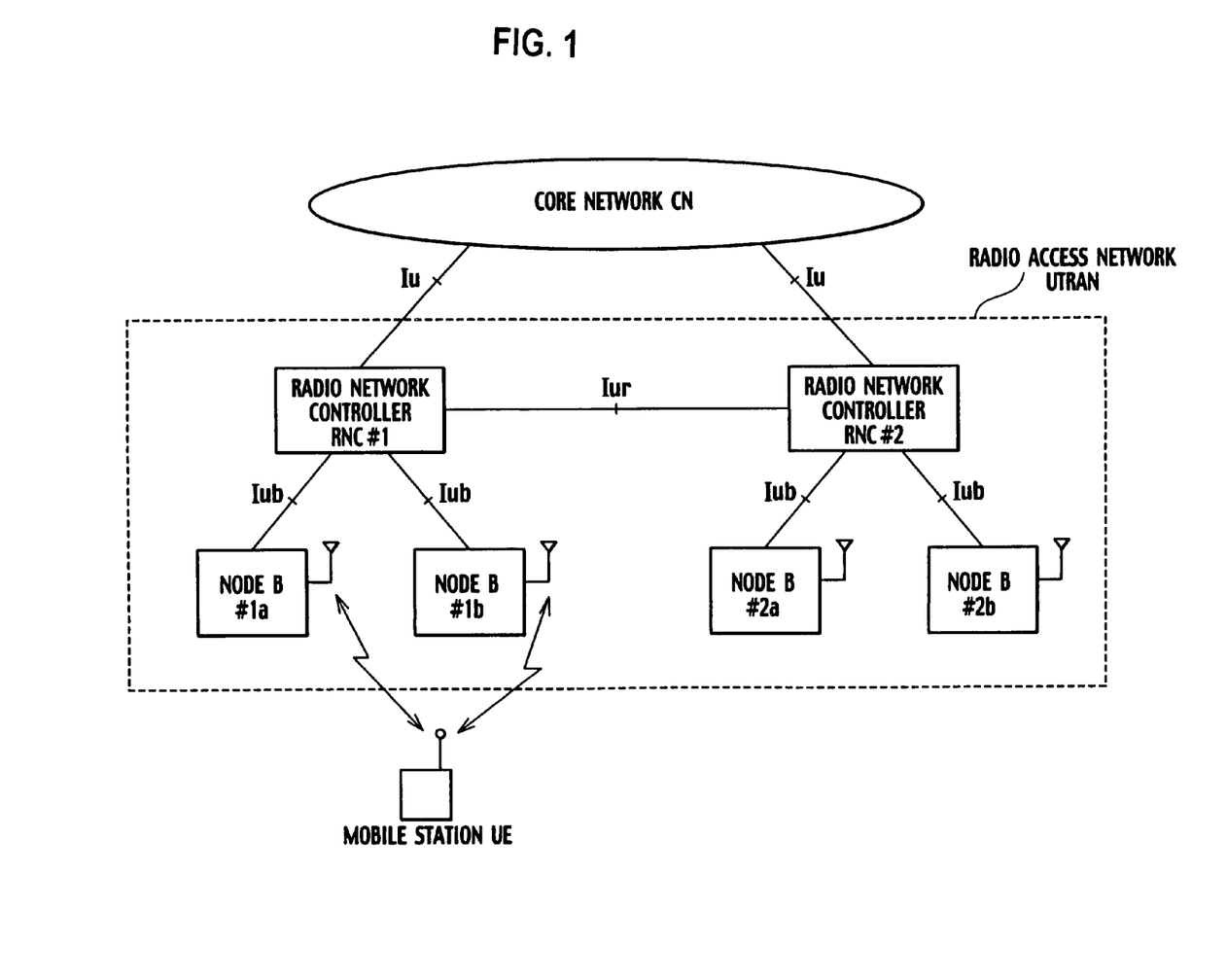
FIG. 1 is an entire structural diagram of a mobile communication system according to the related art and the present invention.

A mobile communication system for transmitting a plurality of same information (multicast data or broadcast data) to a plurality of cells (or sectors) has been known. FIG. 1 shows the entire configuration of such a mobile communication system.

As shown in FIG. 1, the mobile communication system in the related-art includes a core network CN and a radio access network UTRAN. The radio access network UTRAN includes a plurality of radio network controllers RNC #1 and #2, and a plurality of Node Bs (e.g., base stations) #1a to #2b.

The core network CN is connected to the radio network controllers RNC by Iu interfaces. The radio network controllers RNC are connected to each other by an Iur interface. The radio network controllers RNC are connected to the Node Bs by Iub interfaces.

A mobile station UE is configured to receive the same information transmitted from one or more Node Bs through a plurality of cells. In the example of FIG. 1, the mobile station UE receives the same information transmitted from the Node Bs #1a and #1b through a plurality of cells.

As handover processes in the related-art mobile communication system, an intra-frequency handover process, an inter-frequency handover process, an inter-radio access technology (RAT) handover process and so on are known. As an example of the inter-RAT handover process, a handover process between a GSM system and a W-CDMA system is known.

In the related-art mobile communication system, each mobile station UE is configured to measure radio channel quality in a cell adjacent to a cell in which the mobile station UE is located, in order to determine whether to perform the intra-frequency handover process or not.

If radio channel quality in the current cell is lower than that in the adjacent cell, the mobile station UE performs the intra-frequency handover process so as to change the radio channel for use in communication with the radio access network UTRAN, from the radio channel in the current cell to the radio channel in the adjacent cell.

In order to perform the inter-frequency handover process or the inter-RAT handover process for each mobile station UE in the related-art communication system, it is necessary that the mobile station UE measures radio channel quality on a frequency which is different from a frequency on which the mobile station UE is currently communicating.

Measurements of radio channel quality on two or more frequencies for the inter-frequency handover process or the inter-RAT handover process are implemented by inter-frequency measurements or inter-RAT measurements.

In the inter-frequency measurements or the inter-RAT measurements, the measurement object is a Primary Common Pilot Channel (CPICH).

Measurement items include downlink $E_c/I_o$, downlink path loss, downlink received signal code power (RSCV), downlink signal-to-interference ratio (SIR) after despreading in a specific physical channel, and average SIR of all downlink codes belonging to a specific Coded Composite Transport Channel (CCTrCH) and so on.

Figure 2:
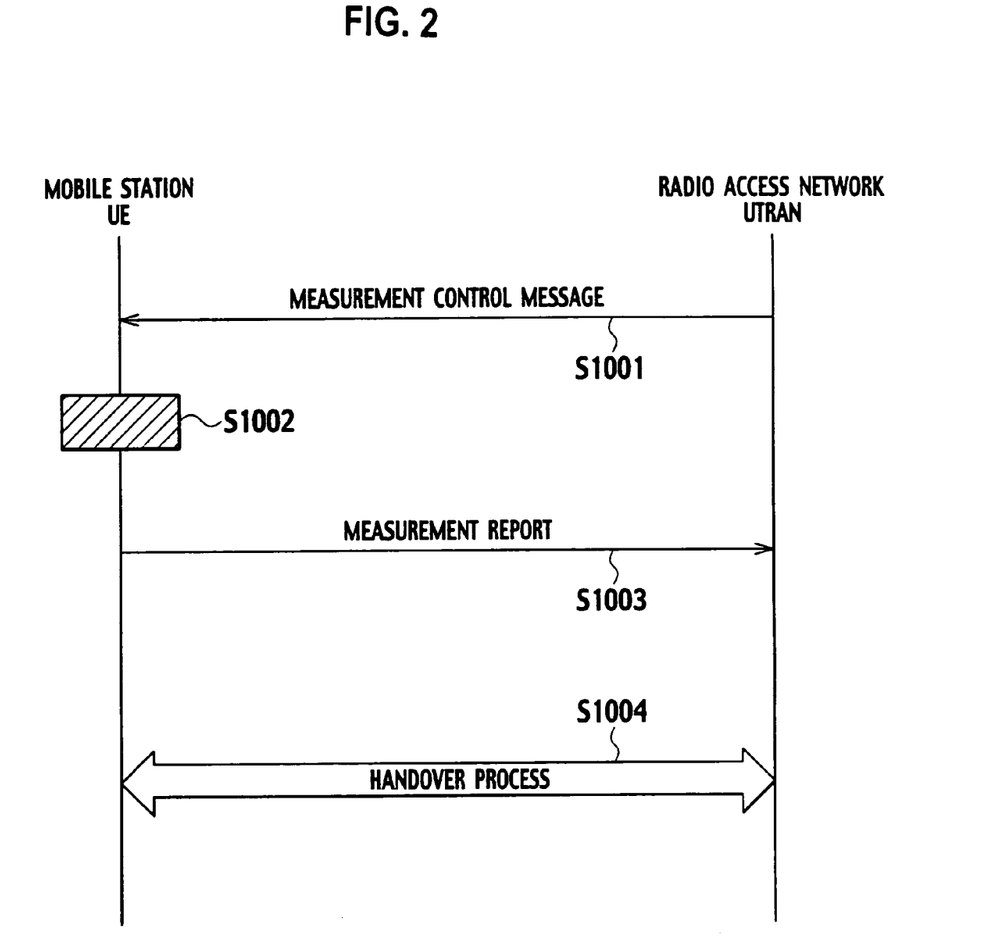
FIG. 2 is a diagram illustrating an overall operation of the mobile communication system according to the related art and the present invention.
Figure 3:
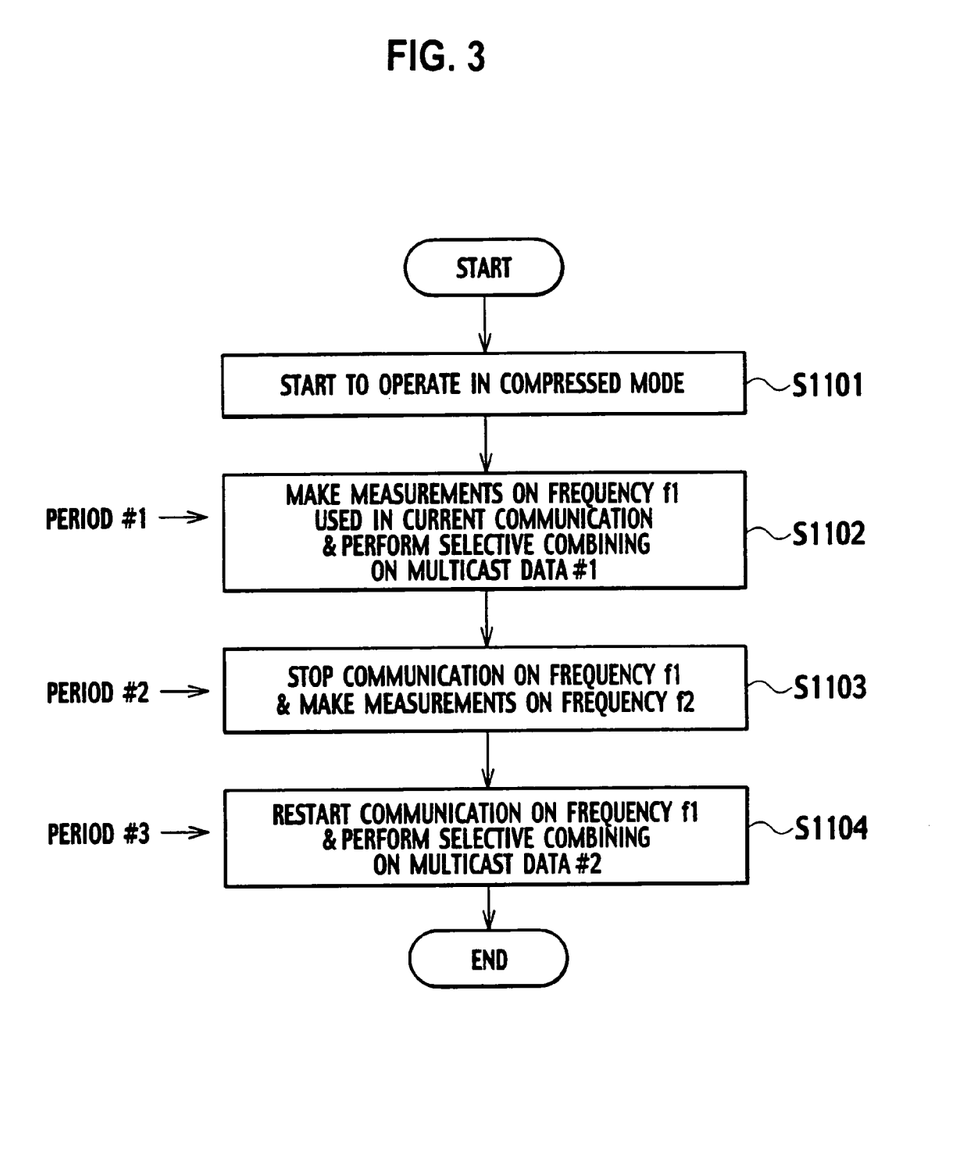
FIG. 3 is a flowchart illustrating an operation of a mobile station according to the related art.
Figure 4:
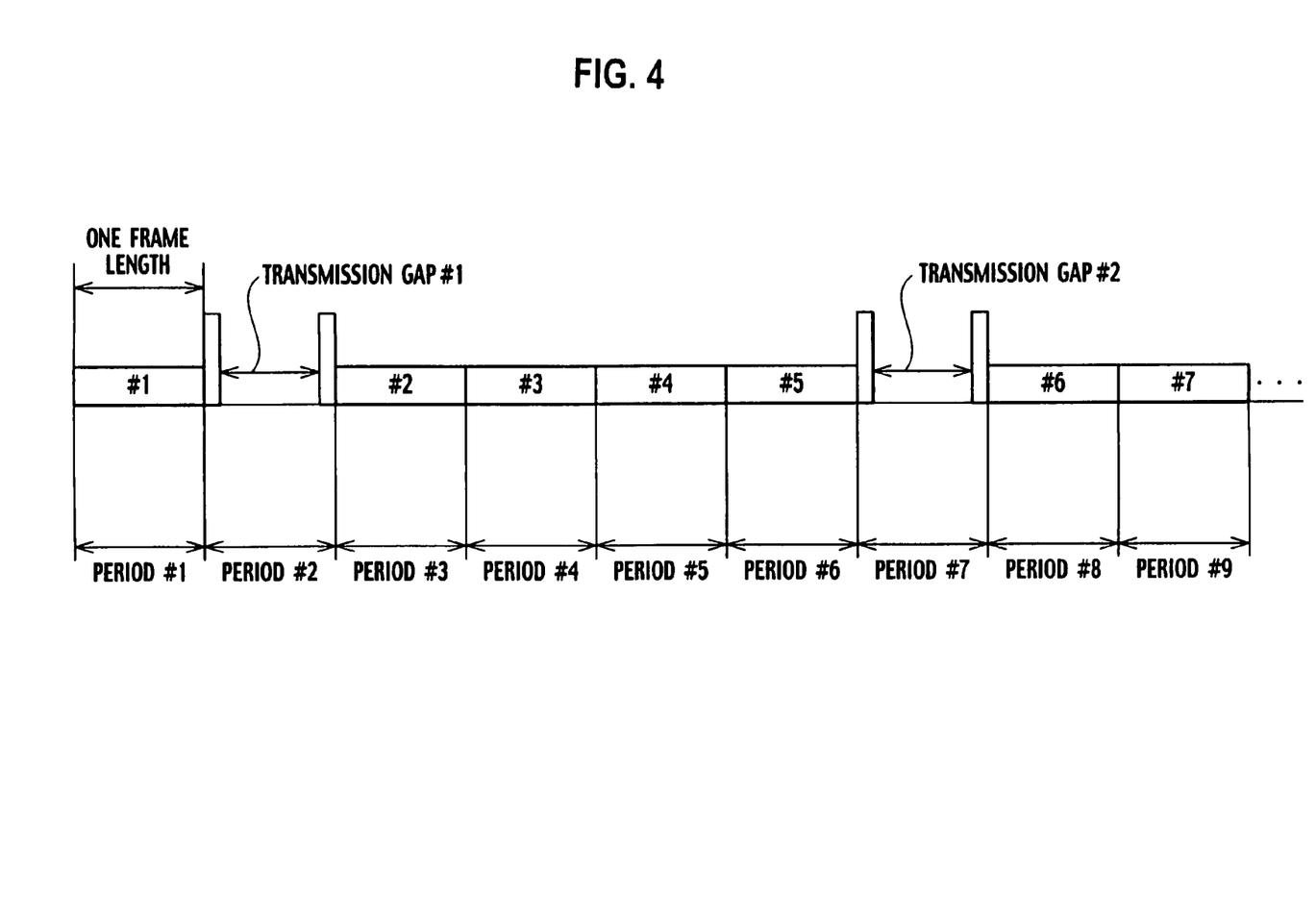
FIG. 4 is a diagram illustrating the transmission timing of multicast data transmitted by a radio network controller according to the related art.

Referring to FIGS. 2 to 4, the inter-frequency handover process or the inter-RAT handover process performed for a mobile station UE in the related-art mobile communication system will be described in detail below.

As shown in FIG. 2, in step S1001, the radio access network UTRAN transmits a measurement control message to the mobile station UE, so as to instruct it to perform inter-frequency measurements or inter-RAT measurements.

The measurement control message includes measurement items to be measured at the mobile station UE and report items to be transmitted to the radio access network UTRAN.

In step S1002, based on the received measurement control message, the mobile station UE performs the inter-frequency measurements or the inter-RAT measurements. Hereinafter, with reference to FIGS. 3 and 4, the operation of the mobile station UE in step S1002 will be described in detail.

As shown in FIG. 3, in step S1101, the mobile station UE starts to operate in compressed mode.

FIG. 4 shows the transmission timing of multicast data by the radio access network UTRAN in compressed mode. Specifically, in compressed mode, the radio access network UTRAN is configured not to transmit multicast data in transmission gaps.

In the example of FIG. 4, the radio access network UTRAN transmits multicast data #1 to #7 to a plurality of cells on a frequency f1 in periods except periods #2 and #7. The mobile station UE is herein performing communication with the radio access network UTRAN on the frequency f1.

In step S1102 (period #1), the mobile station UE monitors a Primary CPICH being transmitted on the frequency f1 from the radio access network UTRAN, so as to perform measurements on the measurement items specified by the measurement control message.

Also, the mobile station UE performs selective combining using a plurality of multicast data #1 transmitted on the frequency f1 from a plurality of cells.

In step S1103 (period #2, transmission gap #1), the mobile station UE stops communication with the radio access network UTRAN, on the frequency f1, and monitors a Primary CPICH being transmitted on a frequency f2 from the radio access network UTRAN, so as to perform measurements on the measurement items specified by the measurement control message.

Herein, the mobile station UE does not have the capability to receive signals of different frequencies simultaneously.

In step S1104 (period #3), the mobile station UE restarts communication with the radio access network UTRAN on the frequency f1, and performs selective combining using multicast data #2 transmitted on the frequency f1 from a plurality of cells.

In step S1003, based on the measurements in step S1002, the mobile station UE generates a measurement report including the report items specified by the measurement control message for transmission to the radio access network UTRAN.

In step S1004, based on the received measurement report, the radio access network UTRAN instructs the mobile station UE to perform the inter-frequency handover process or the inter-RAT handover process.

As a result, the mobile station UE changes the frequency on which to perform communication with the radio access network UTRAN, from the frequency f1 to the frequency f2.

In the related-art mobile communication system, however, in order to perform the inter-frequency handover process or the inter-RAT handover process, it is necessary that the mobile station UE stops communication with the radio access network UTRAN so as to perform the inter-frequency measurements or the inter-RAT measurements.

Also, since different mobile stations UE start to operate in compressed mode at different timings, the radio access network UTRAN cannot make transmission gap timings for all the mobile stations UE coincide.

This causes a problem in that there is a possibility in that the mobile stations UE cannot receive multicast data transmitted from the radio access network UTRAN while stopping communication with the radio access network UTRAN.

BRIEF SUMMARY OF THE INVENTION

The present invention has been made in view of the above problems, and has an object of providing a mobile communication system and a radio network controller which are capable of reducing the possibility in that some multicast data cannot be received in a period in which inter-frequency measurements or inter-RAT measurements are performed.

A first aspect of the present invention is summarized as a mobile communication system configured to transmit a plurality of same information to a plurality of cells. The mobile communication system includes a transmission timing determiner configured to determine a transmission timing of the same information to each of the cells randomly or in such a manner that transmission timings differ between the cells, and a transmitter configured to transmit the same information to the cells at the determined transmission timings.

In the first aspect, the mobile communication system can further include a mobile station configured to perform selective combining using a plurality of same information transmitted from the cells.

In the first aspect, the transmitter can be configured to transmit the same information to the cells at the determined transmission timings, when the mobile station measures radio conditions on a plurality of frequencies.

In the first aspect, the transmission timing determiner can be configured to determine the transmission timing of the same information, in a unit of a transmission frame of the same information or in a TTI of the same information.

In the first aspect, the cells can be under a same radio network controller or under a same base station.

A second aspect of the present invention is summarized as a radio network controller configured to transmit a plurality of same information to a plurality of cells. The radio network controller includes a transmission timing determiner configured to determine a transmission timing of the same information to each of the cells randomly or in such a manner that transmission timings differ between the cells, and a transmitter configured to transmit the same information to the cells at the determined transmission timings.

In the second aspect, the cells can be located in an area in which a mobile station can perform selective combining.

In the second aspect, the transmitter can be configured to transmit the same information to the cells at the determined transmission timings, when the mobile station measures radio conditions on a plurality of frequencies.

In the second aspect, the transmission timing determiner can be configured to determine the transmission timing of the same information in a unit of a transmission frame of the same information or in a TTI of the same information.

In the second aspect, the cells can be under a same radio network controller or under a same base station.

DETAILED DESCRIPTION OF THE INVENTION

Mobile Communication System in First Embodiment of the Invention

With reference to FIGS. 5 to 9, a mobile communication system according to a first embodiment of the present invention will be described. The entire configuration of the mobile communication system in the first embodiment is identical to the configuration shown in FIG. 1.

The mobile communication system in the first embodiment is configured to transmit a plurality of same information (broadcast data or multicast data) to a plurality of cells (or sectors) managed by one or more Node Bs (e.g., base stations).

Hereinafter, in the first embodiment, the expression "multicast data" includes broadcast data, and the expression "cell" includes a sector.

Figure 5:
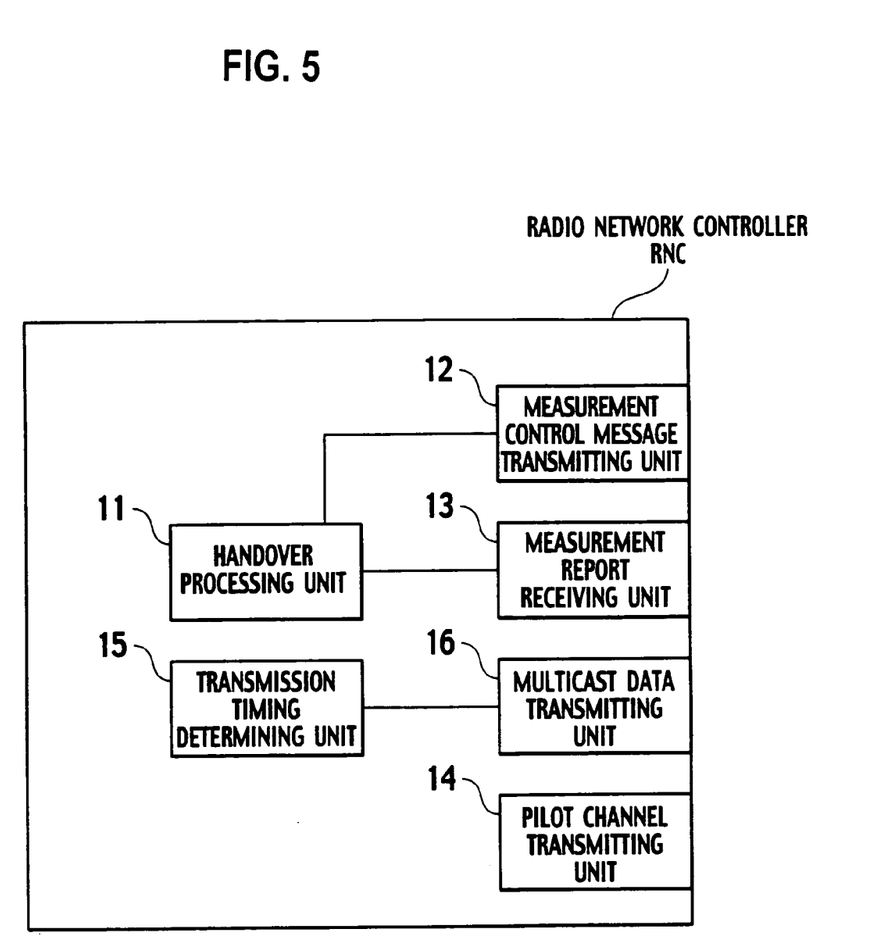
FIG. 5 is a functional block diagram of a radio network controller according to a first embodiment of the present invention.

As shown in FIG. 5, a radio network controller RNC according to the first embodiment is provided with a handover processing unit 11, a measurement control message transmitting unit 12, a measurement report receiving unit 13, a pilot channel transmitting unit 14, a transmission timing determining unit 15, and a multicast data transmitting unit 16.

The handover processing unit 11 is configured to instruct a mobile station UE to perform a handover process, based on a measurement report received by the measurement report receiving unit 13.

Specifically, based on measurements of quality of radio channels with the mobile station UE, the handover processing unit 11 instructs the mobile station UE to perform an inter-frequency handover process or an inter-RAT handover process, so as to change the frequency for use in communication with a radio access network UTRAN.

The measurement control message transmitting unit 12 is configured to transmit a measurement control message specifying measurement items and report items to a mobile station UE, so as to request measurements of Primary CPICHs for determining whether or not to perform an inter-frequency handover process or an inter-RAT handover process.

The measurement control message transmitting unit 12 can also use the measurement control message, so as to specify the number of slots of a transmission gap, the interval between transmission gaps, the number of repetitions of transmission gaps and so on in compressed mode to the mobile station UE.

The measurement report receiving unit 13 is configured to receive a measurement report transmitted from a mobile station UE, and to communicate it to the handover processing unit 11.

The pilot channel transmitting unit 14 is configured to transmit Primary CPICHs on predetermined frequencies (e.g., frequencies f1 and f2). In this embodiment, the frequency f1 is the frequency currently used in communication with the radio access network UTRAN.

The transmission timing determining unit 15 is configured to determine a transmission timing of multicast data to be transmitted to a plurality of cells by the multicast data transmitting unit 16.

More specifically, the transmission timing determining unit 15 may be configured to randomly determine a transmission timing of multicast data to each of the cells, or may be configured to determine a transmission timing of multicast data to each of the cells in such a manner that transmission timings differ between the cells.

The transmission timing determining unit 15 may also be configured to determine the transmission timing of multicast data in a unit of a transmission frame of multicast data (e.g., in 10 ms), or in a TTI of multicast data (e.g., in 80 ms). TTI herein represents a packet transmission time interval in a physical layer.

The multicast data transmitting unit 16 is configured to transmit the same multicast data to a plurality of cells on the frequency f1 at transmission timings determined by the transmission timing determining unit 15.

Figure 6:
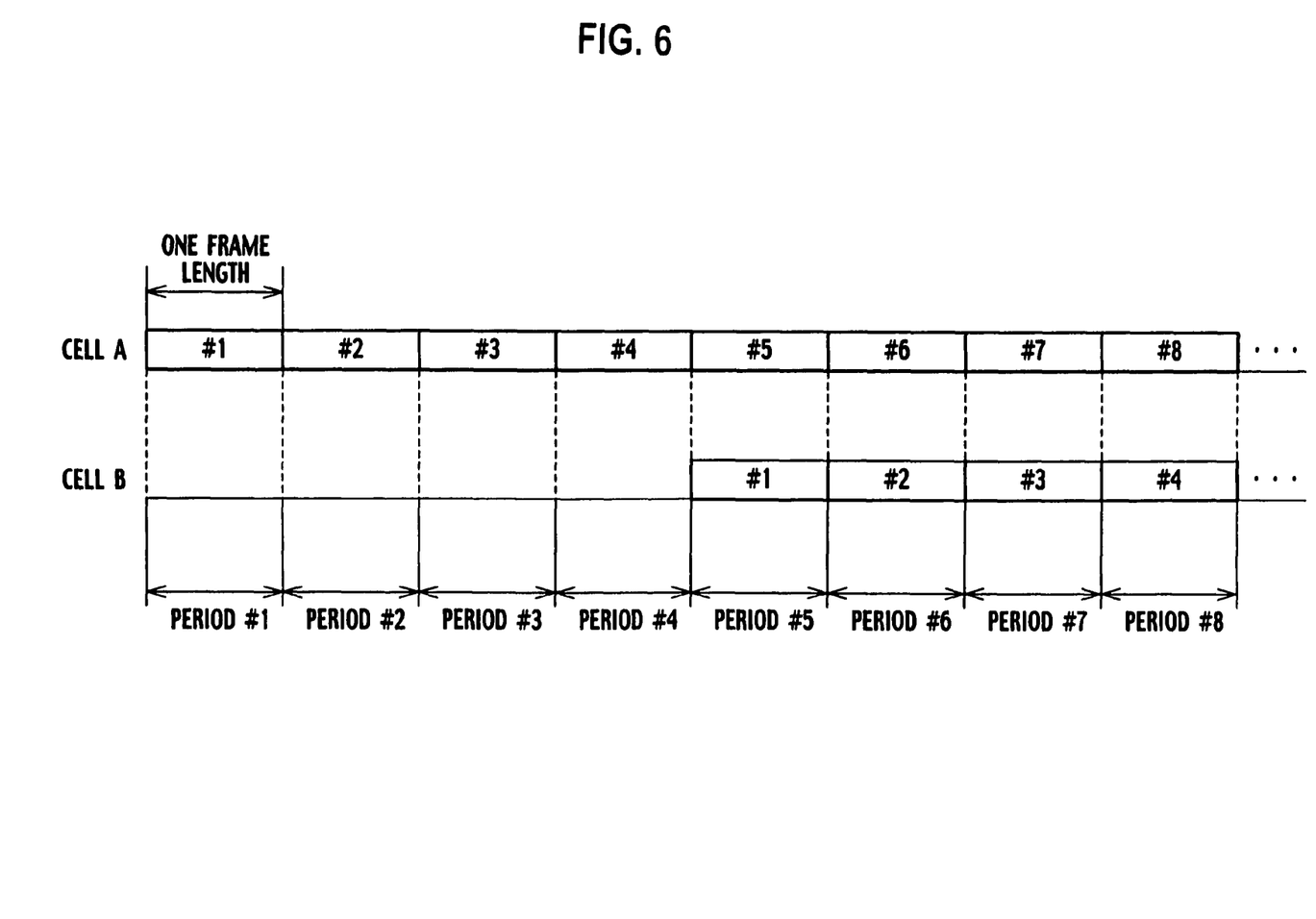
FIG. 6 is a diagram illustrating the transmission timing of multicast data transmitted by the radio network controller according to the first embodiment of the present invention.

As shown in FIG. 6, for example, the multicast data transmitting unit 16 is configured to provide a time difference of a four-frame length between a transmission start time of multicast data to a cell A and a transmission start time of the multicast data to a cell B, based on transmission timings determined by the transmission timing determining unit 15. In the example of FIG. 6, transmission gaps are not shown.

The multicast data transmitting unit 16 may alternatively be configured to provide a time difference of 2 TTIs between a transmission start time of multicast data to the cell A and a transmission start time of the multicast data to the cell B, based on transmission timings determined by the transmission timing determining unit 15.

The multicast data transmitting unit 16 may also be configured to transmit the same multicast data to a plurality of cells in an area in which a mobile station UE can perform selective combining, at different transmission timings.

The multicast data transmitting unit 16 may alternatively be configured to transmit the same multicast data to a plurality of cells under the same radio network controller RNC or a plurality of cells under the same Node B, at different transmission timings.

The multicast data transmitting unit 16 may also be configured to transmit the same multicast data to a plurality of cells at transmission timings determined by the transmission timing determining unit 15, when the mobile station UE measures radio channel quality (radio conditions) on the frequencies f1 and f2, that is, when the measurement control message transmitting unit 12 instructs the mobile station UE to perform inter-frequency measurements or inter-RAT measurements.

Figure 7:
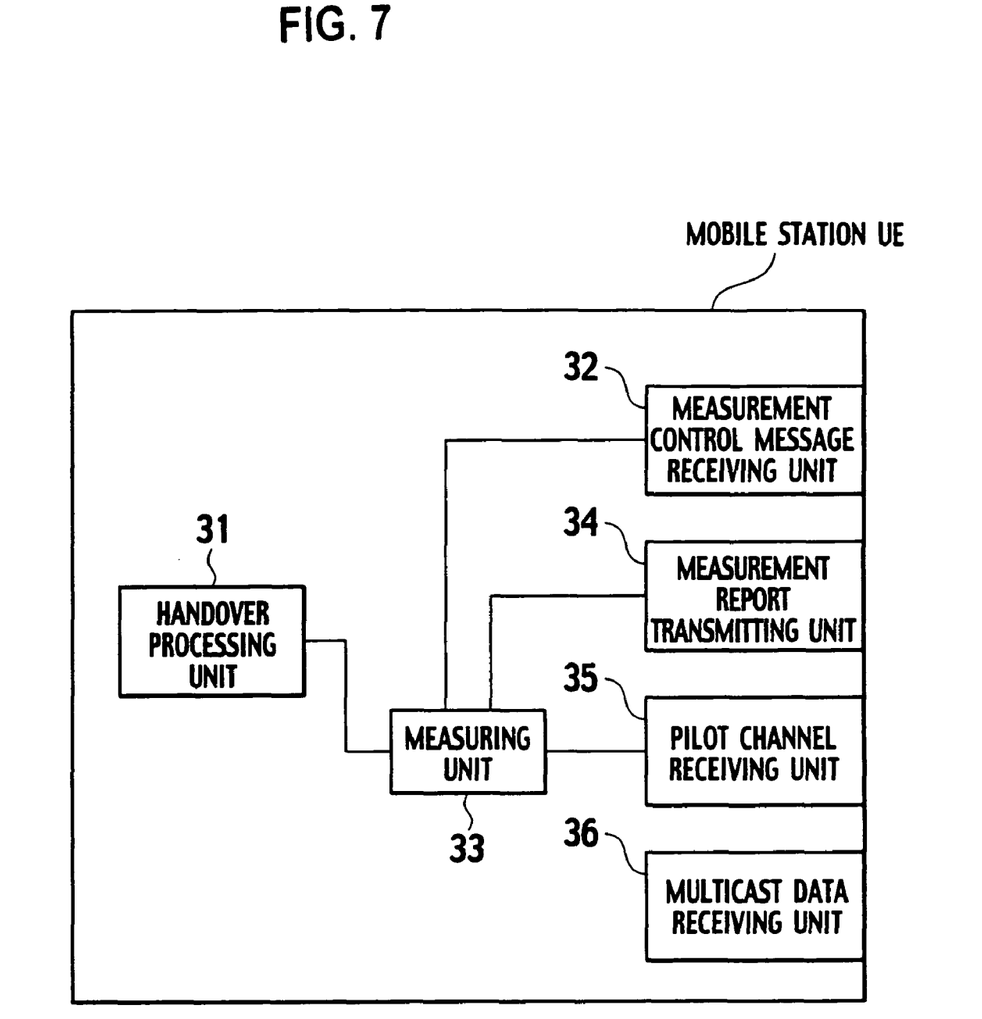
FIG. 7 is a functional block diagram of a mobile station according to the first embodiment of the present invention.

As shown in FIG. 7, a mobile station UE according to the first embodiment is provided with a handover processing unit 31, a measurement control message receiving unit 32, a measuring unit 33, a measurement report transmitting unit 34, a pilot channel receiving unit 35, and a multicast data receiving unit 36.

The handover processing unit 31 is configured to perform a handover process based on an instruction from the radio access network UTRAN.

More specifically, the handover processing unit 31 performs an inter-frequency handover process or an inter-RAT handover process based on an instruction from the radio access network UTRAN, and changes the frequency for use in communication with the radio access network UTRAN.

The handover processing unit 31 may alternatively be configured to perform a handover process based on measurements at the measuring unit 33.

The measurement control message receiving unit 32 is configured to receive a measurement control message transmitted from the radio access network UTRAN and communicate it to the measuring unit 33.

The measuring unit 33 is configured to monitor CPICHs on predetermined frequencies (e.g., f1 and f2), so as to perform measurements on measurement items specified in a measurement control message communicated from the measurement control message receiving unit 32.

The measuring unit 33 may be configured to perform the measurements in a transmission gap in compressed mode, or may be configured to perform the measurements at a desired timing, for example.

The measurement report transmitting unit 34 is configured to generate a measurement report including report items specified in a measurement control message, based on measurements by the measuring unit 33, for transmission.

The pilot channel receiving unit 35 is configured to receive CPICHs transmitted on the frequencies f1 and f2 from the radio access network UTRAN.

The multicast data receiving unit 36 is configured to perform selective combining using a plurality of same multicast data transmitted on the frequency f1 from the radio access network UTRAN through a plurality of cells.

Figure 8:
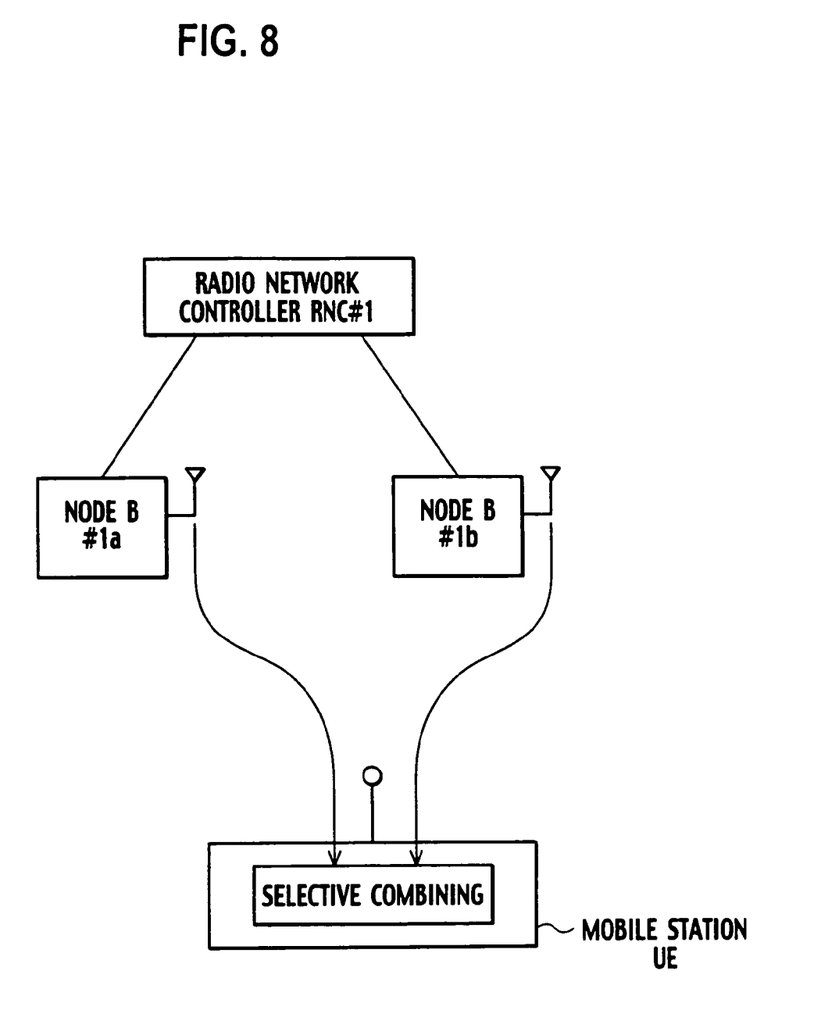
FIG. 8 is a diagram illustrating selective combining at the mobile station according to the first embodiment of the present invention.

As shown in FIG. 8, for example, the multicast data receiving unit 36 is configured to compare reliability information on multicast data received from a cell managed by a Node B #1a with reliability information on multicast data received from a cell managed by a Node B #1b, and select the multicast data with higher reliability information.

As shown in FIG. 6, the multicast data receiving unit 36 can also perform selective combining using multicast data received at different timings, such as multicast data #1 transmitted from a cell A in period #1 and multicast data #1 transmitted from a cell B in period #5.

Figure 9:
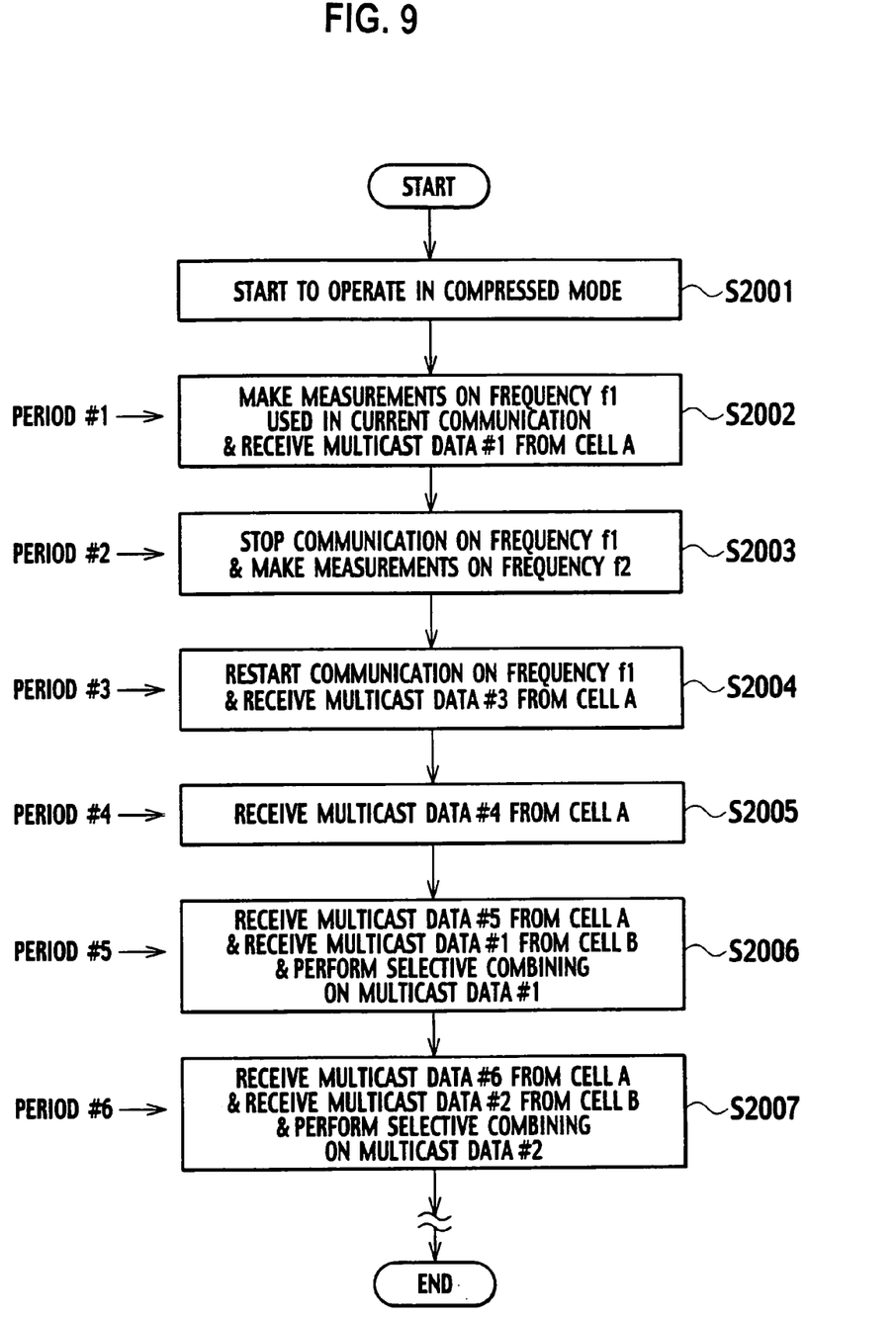
FIG. 9 is a flowchart illustrating an operation of the mobile station according to the first embodiment of the present invention.

With reference to FIG. 9, the operation of the mobile station UE performing inter-frequency measurements or inter-RAT measurements when the radio access network UTRAN is transmitting multicast data on the frequency f1 to the cells A and B at transmission timings shown in FIG. 6 in the mobile communication system in the first embodiment will be described.

The mobile station UE herein does not have the capability to receive signals of the frequencies f1 and f2 simultaneously.

As shown in FIG. 9, in step S2001, the mobile station UE starts to operate in compressed mode.

In step S2002 (period #1), the mobile station UE monitors a Primary CPICH transmitted on the frequency f1 from the radio access network UTRAN, and performs measurements on measurement items specified by a measurement control message. The mobile station UE also receives multicast data #1 transmitted from the cell A on the frequency f1.

In step S2003 (period #2), the mobile station UE stops communication with the radio access network UTRAN on the frequency f1, monitors a Primary CPICH transmitted from the radio access network UTRAN on the frequency f2, and performs measurements on the measurement items specified by the measurement control message. Accordingly, the mobile station UE cannot receive multicast data #2 transmitted from the cell A on the frequency f1.

In step S2004 (period #3), the mobile station UE restarts communication with the radio access network UTRAN on the frequency f1 and receives multicast data #3 transmitted from the cell A on the frequency f1.

In step S2005 (period #4), the mobile station UE receives multicast data #4 transmitted from the cell A on the frequency f1.

In step S2006 (period #5), the mobile station UE receives multicast data #5 transmitted from the cell A on the frequency f1, and also receives multicast data #1 transmitted from the cell B on the frequency f1.

At that time, the mobile station UE performs selective combining on the multicast data #1, using the multicast data #1 received from the cell A in step S2002 and the multicast data #1 received from the cell B in step S2006.

In step S2007 (period #6), the mobile station UE receives multicast data #6 transmitted from the cell A on the frequency f1, and also receives multicast data #2 transmitted from the cell B on the frequency f1.

At that time, since the mobile station UE has not received multicast data #2 from the cell A in step S2003, the multicast data #2 received from the cell B in step S2007 constitutes received multicast data #2.

According to the mobile communication system in the first embodiment, since the mobile station UE can perform selective combining using a plurality of same multicast data transmitted through the cells A and B at different transmission timings, the possibility in that some multicast data cannot be received in a period in which inter-frequency measurements or inter-RAT measurements are performed can be reduced.

Mobile Communication System in Second Embodiment of the Invention

Figure 10:
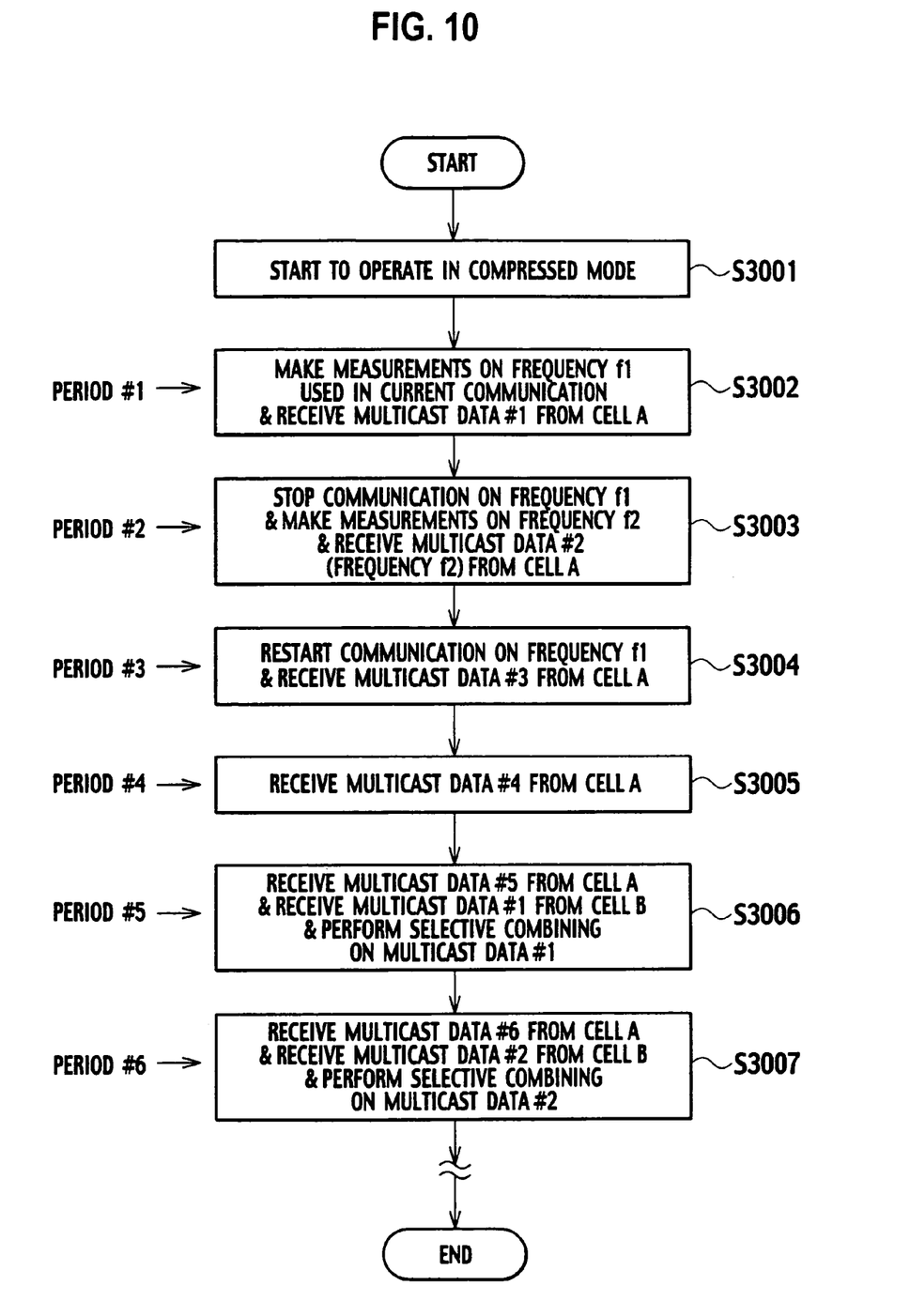
FIG. 10 is a flowchart illustrating an operation of a mobile station according to a second embodiment of the present invention.

With reference to FIG. 10, a mobile communication system according to a second embodiment of the present invention will be described. Hereinafter, mainly, differences of the mobile communication system in the second embodiment from the mobile communication system in the above-described first embodiment will be described.

In the mobile communication system in the second embodiment, a radio access network UTRAN is configured to transmit multicast data to a plurality of cells on a frequency f1 currently used in communication with a mobile station UE, and also transmit the same multicast data on another frequency f2.

With reference to FIG. 10, the operation of the mobile station UE performing inter-frequency measurements or inter-RAT measurements when the radio access network UTRAN is transmitting multicast data to cells A and B on the frequency f1 at transmission timings shown in FIG. 6 in the mobile communication system in the second embodiment will be described.

The mobile station UE herein does not have the capability to receive signals of the frequencies f1 and f2 simultaneously.

As shown in FIG. 10, in step S3001, the mobile station UE starts to operate in compressed mode.

In step S3002 (period #1), the mobile station UE monitors a Primary CPICH transmitted from the radio access network UTRAN on the frequency f1, and performs measurements on measurement items specified by a measurement control message. The mobile station UE also receives multicast data #1 transmitted from the cell A on the frequency f1.

In step S3003 (period #2), the mobile station UE stops communication with the radio access network UTRAN on the frequency f1, monitors a Primary CPICH transmitted from the radio access network UTRAN on the frequency f2, and performs measurements on the measurement items specified by the measurement control message. The mobile station UE also receives multicast data #2 transmitted from the cell A on the frequency f2.

In step S3004 (period #3), the mobile station UE restarts communication with the radio access network UTRAN on the frequency f1, and receives multicast data #3 transmitted from the cell A on the frequency f1.

In step S3005 (period #4), the mobile station UE receives multicast data #4 transmitted from the cell A on the frequency f1.

In step S3006 (period #5), the mobile station UE receives multicast data #5 transmitted from the cell A on the frequency f1, and also receives multicast data #1 transmitted from the cell B on the frequency f1.

At that time, the mobile station UE performs selective combining on the multicast data #1 using the multicast data #1 received from the cell A in step S3002 and the multicast data #1 received from the cell B in step S3006.

In step S3007 (period #6), the mobile station UE receives multicast data #6 transmitted from the cell A on the frequency f1, and also receives multicast data #2 transmitted from the cell B on the frequency f1.

At that time, the mobile station UE performs selective combining on the multicast data #2 using the multicast data #2 received from the cell A on the frequency f2 in step S3003 and the multicast data #2 received from the cell B on the frequency f1 in step S3007.

According to the present invention, since a mobile station UE can perform selective combining using a plurality of same information transmitted at different transmission timings through a plurality of cells, the possibility in that some multicast data cannot be received in a period in which inter-frequency measurements or inter-RAT measurements are performed can be reduced.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A mobile communication system, comprising:
a transmitter configured to transmit a plurality of same information addressed to a plurality of mobile stations to a plurality of cells;
each of the plurality of mobile stations configured to measure, by an inter-frequency measurement or an inter-radio access technology (inter-RAT) measurement, radio channel quality of a frequency different from a frequency through which the same information is transmitted, when judging whether or not to perform an inter-frequency handover process or an inter-RAT handover process;
a transmission timing determiner configured to determine a transmission timing of the same information to each of the cells randomly or in such a manner that transmission timings differ between the cells; and
the transmitter configured to transmit the same information to the cells at the determined transmission timings.

2. The mobile communication system as set forth in claim 1, wherein each of the plurality of mobile stations are configured to perform selective combining using a plurality of same information transmitted from the cells.

3. The mobile communication system as set forth in claim 2, wherein the transmitter is configured to transmit the same information to the cells at the determined transmission timings, when each of the plurality of mobile stations measure radio conditions on a plurality of frequencies.

4. The mobile communication system as set forth in claim 1, wherein the transmission timing determiner is configured to determine the transmission timing of the same information, in a unit of a transmission frame of the same information or in a TTI of the same information.

5. The mobile communication system as set forth in claim 1, wherein the cells are under a same radio network controller or under a same base station.

6. A radio network controller, comprising:
a transmitter configured to transmit a plurality of same information addressed to a plurality of mobile stations to a plurality of cells, wherein the plurality of mobile stations are each configured to measure, by an inter-frequency measurement or an inter-radio access technology (inter-RAT) measurement, radio channel quality of a frequency different from a frequency through which the same information is transmitted, when judging whether or not to perform an inter-frequency handover process or inter-RAT handover process;
a transmission timing determiner configured to determine a transmission timing of the same information to each of the cells randomly or in such a manner that transmission timings differ between the cells; and
the transmitter configured to transmit the same information to the cells at the determined transmission timings.

7. The radio network controller as set forth in claim 6, wherein the cells are located in an area in which each of the plurality of mobile stations can perform selective combining.

8. The radio network controller as set forth in claim 7, wherein the transmitter is configured to transmit the same information to the cells at the determined transmission timings, when each of the mobile stations measure radio conditions on a plurality of frequencies.

9. The radio network controller as set forth in claim 6, wherein the transmission timing determiner is configured to determine the transmission timing of the same information in a unit of a transmission frame of the same information or in a TTI of the same information.

10. The radio network controller as set forth in claim 6, wherein the cells are under a same radio network controller or under a same base station.

* * * * *